(12) United States Patent
Yamashita et al.

(10) Patent No.: US 7,885,716 B2
(45) Date of Patent: Feb. 8, 2011

(54) AUDIO/VISUAL DATA COMMUNICATION SYSTEM, AUDIO/VISUAL DATA TRANSMITTING DEVICE, AND AUDIO/VISUAL DATA REPRODUCING DEVICE

(75) Inventors: Nobuyuki Yamashita, Hachioji (JP); Kazuyoshi Tari, Tokyo-to (JP); Kenzo Nakamura, Nishitokyo (JP)

(73) Assignee: Mitsubishi Materials Corporation, Tokyo (JP)

( * ) Notice: Subject to any disclaimer, the term of this patent is extended or adjusted under 35 U.S.C. 154(b) by 963 days.

(21) Appl. No.: 11/574,549

(22) PCT Filed: Sep. 2, 2005

(86) PCT No.: PCT/JP2005/016081

§ 371 (c)(1),
(2), (4) Date: Apr. 20, 2007

(87) PCT Pub. No.: WO2006/025514

PCT Pub. Date: Mar. 9, 2006

(65) Prior Publication Data

US 2007/0293955 A1    Dec. 20, 2007

(30) Foreign Application Priority Data

Sep. 2, 2004 (JP) .............................. 2004-255416
Aug. 26, 2005 (JP) .............................. 2005-245472

(51) Int. Cl.
*G05B 13/02* (2006.01)
(52) U.S. Cl. ......................................... 700/28; 375/257
(58) Field of Classification Search ................ 370/485, 370/503, 395; 709/238, 228; 340/310, 425
See application file for complete search history.

(56) References Cited

U.S. PATENT DOCUMENTS 5,592,482 A    1/1997    Abraham (Continued)

FOREIGN PATENT DOCUMENTS

JP    2001-275194    10/2001

(Continued)

OTHER PUBLICATIONS

International Search Report for PCT/JP2005/016081 mailed Dec. 13, 2005.

*Primary Examiner*—Thong H Vu
(74) *Attorney, Agent, or Firm*—Leason Ellis LLP.

(57) ABSTRACT

The present invention provides an audio/visual data communication system including an audio/visual data reproducing device capable of changing the type of data to be transmitted. Further, the present invention provides an audio/visual data transmitting device and an audio/visual data reproducing device forming the audio/visual data communication system. An audio data reproducing speaker 3 includes an instruction input unit 33 that inputs an instruction to change data transmitted from an audio data transmitting device, a message generating unit 32 that generates a message for requesting to change data on the basis of the instruction, and a message transmitting unit 31 that transmits the message. The audio data transmitting device includes a message receiving unit that receives the message transmitted from the message transmitting unit 31, a data setting unit that sets data on the basis of the message, a data generating unit that generates transmission data on the basis of the data set by the data setting unit, and a data transmitting unit that transmits the transmission data.

6 Claims, 7 Drawing Sheets

U.S. PATENT DOCUMENTS

| | | | |
|---|---|---|---|
| 5,802,281 A * | 9/1998 | Clapp et al. | 709/228 |
| 6,064,297 A * | 5/2000 | Odinak et al. | 340/310.11 |
| 6,346,890 B1 * | 2/2002 | Bellin | 340/825.52 |
| 6,348,875 B1 | 2/2002 | Odinak et al. | |
| 6,611,537 B1 * | 8/2003 | Edens et al. | 370/503 |
| 6,958,877 B2 * | 10/2005 | Gotou et al. | 360/73.03 |
| 7,015,799 B1 * | 3/2006 | Kitano et al. | 340/425.5 |
| 7,098,773 B2 * | 8/2006 | Berkman | 370/485 |
| 7,173,935 B2 * | 2/2007 | Lou et al. | 370/395.5 |
| 7,257,644 B2 * | 8/2007 | Simonnet et al. | 709/238 |
| 2004/0006484 A1 | 1/2004 | Manis et al. | |
| 2008/0084936 A1 * | 4/2008 | Yamashita et al. | 375/257 |

FOREIGN PATENT DOCUMENTS

| | | |
|---|---|---|
| WO | WO-01/31806 | 5/2001 |
| WO | 2004/003774 | 1/2004 |
| WO | 2004/004178 | 1/2004 |

* cited by examiner

AUDIO/VISUAL DATA COMMUNICATION SYSTEM, AUDIO/VISUAL DATA TRANSMITTING DEVICE, AND AUDIO/VISUAL DATA REPRODUCING DEVICE

CROSS-REFERENCE TO PRIOR APPLICATION

This is a U.S. National Phase Application under 35 U.S.C. §371 of International Patent Application No. PCT/JP2005/016081 filed Sep. 2, 2005, and claims the benefit of Japanese Patent Application Nos. 2004-255416, filed Sep. 2, 2004 and 2004-245472, filed Aug. 26, 2005, both of which are incorporated by reference herein. The International Application was published in Japanese on Mar. 9, 2006 as WO 2006/025514 A1 under PCT Article 21(2).

TECHNICAL FIELD

The present invention relates to an audio/visual data communication system for performing data communication through a power line, to an audio/visual data transmitting device, and to an audio/visual data reproducing device.

BACKGROUND ART OF THE INVENTION

In general, a speaker system disclosed in Patent Document 1 as below has been known as a technique for outputting data from an audio data transmitting device to an audio data reproducing speaker and reproducing the data.

In the speaker system, audio data is wirelessly transmitted from one audio data transmitting device to a plurality of audio data reproducing speakers. In this way, the speakers can reproduce different types of audio data.

However, data is transmitted from the audio data transmitting device to the audio data reproducing speakers, but it is difficult to transmit data from the audio data reproducing speakers to the audio data transmitting device.

Therefore, when the audio data transmitting device and the audio data reproducing speakers are provided in different rooms, it is difficult for the audio data reproducing speaker to change the volume or audio data to be reproduced, which is inconvenient for use.

PATENT DOCUMENT 1: Japanese Unexamined Patent Application, First Publication No. 2001-275194

DETAILED DESCRIPTION OF THE INVENTION

Problems to be Solved by the Invention

The present invention has been made in view of the above-mentioned problems, and an object of the invention is to provide an audio/visual data communication system including an audio/visual data reproducing device capable of changing the type of data to be transmitted, and an audio/visual data transmitting device and an audio/visual data reproducing device forming the audio/visual data communication system.

Means for Solving the Problem

According to the present invention of claim 1, an audio/visual data communication system includes: an audio/visual data transmitting device that transmits data through a power line; and an audio/visual data reproducing device that receives the data and reproduces the data. The audio/visual data reproducing device includes: an instruction input unit that inputs an instruction to change the data received from the audio/visual data transmitting device; a message generating unit that generates a message for requesting to change the data transmitted from the audio/visual data transmitted device on the basis of the instruction input through the instruction input unit; and a message transmitting unit that transmits the message generated by the message generating unit to the audio/visual data transmitting device. The audio/visual data transmitting device includes: a message receiving unit that receives the message transmitted from the message transmitting unit; a data setting unit that sets data to be transmitted to the audio/visual data reproducing device on the basis of the message received by the message receiving unit; a data generating unit that generates transmission data to be transmitted to the audio/visual data reproducing device on the basis of the data set by the data setting unit; and a data transmitting unit that transmits the transmission data generated by the data generating unit to the audio/visual data reproducing device.

According to the present invention of claim 2, in the audio/visual data communication system according to claim 1, preferably, the audio/visual data transmitting device further includes a first group ID storage unit that stores group IDs for identifying the same audio/visual data, and the audio/visual data reproducing device further includes a second group ID storage unit that stores the group IDs. Preferably, the data generating unit generates the transmission data having the group ID stored in the first group ID storage unit, and the audio/visual data reproducing device receives data when the group ID included in the transmission data transmitted from the data transmitting unit is identical with the group ID stored in the second group ID storage unit.

According to the present invention of claim 3, in the audio/visual data communication system according to claim 2, preferably, the audio/visual data reproducing devices are arranged in a plurality of rooms, and the group IDs stored in the second group ID storage unit are allocated to the rooms according to the purpose of usage of the rooms.

According to the present invention of claim 4, an audio/visual data transmitting device transmits data to an audio/visual data reproducing device through a power line. The audio/visual data transmitting device includes: a data storage unit that stores unique IDs allocated to the audio/video reproducing devices, group IDs for identifying the same audio/visual data, and audio/visual data; a message receiving unit that receives a message for requesting to change data to be transmitted to the audio/visual data reproducing device; a data setting unit that sets the data to be transmitted to the audio/visual data reproducing device on the basis of the message received by the message receiving unit; a data generating unit that generates transmission data on the basis of the data stored in the data storage unit and the data set by the data setting unit; and a data transmitting unit that transmits the transmission data generated by the data generating unit to the audio/visual data reproducing device through the power line.

According to the present invention of claim 5, in the audio/visual data transmitting device according to claim 4, preferably, the data setting unit sets the volume of the audio/visual data, the type of the audio/visual data, or a change of the audio/visual data transmitting device, which is a source of the audio/visual data.

According to the present invention of claim 6, an audio/visual data reproducing device receives data from an audio/visual data transmitting device through a power line. The audio/visual data reproducing device includes: a data storage unit that stores unique IDs allocated to the audio/visual data reproducing devices and group IDs for identifying the same audio/visual data; a data receiving unit that determines whether to receive data transmitted from the audio/visual data transmitting device through the power line on the basis of the data stored in the data storage unit; an audio/visual data reproducing unit that reproduces the data received by the data receiving unit; an instruction input unit that inputs an instruction to change data reproduced by the audio/visual data reproducing device; a message generating unit that generates a message for requesting to change data to be transmitted to the audio/visual data transmitting device on the basis of the instruction input through the instruction input unit; and a message transmitting unit that transmits the message generated by the message generating unit to the audio/visual data transmitting device through the power line.

ADVANTAGEOUS EFFECTS OF THE INVENTION

According to the invention, a user inputs instructions through the instruction input unit of the audio/visual data reproducing device, and the data setting unit of the audio/visual data transmitting device sets data to be transmitted to the audio/visual data reproducing device on the basis of the instruction.

Therefore, even when the audio/visual data transmitting device and the audio/visual data reproducing device are arranged in different rooms, it is possible for a user to change the volume using the audio/visual data reproducing device, without operating the audio/visual data transmitting device. Thus, it is possible to improve the convenience of the user.

Further, in the invention, group IDs are stored in both the first group ID storage unit of the audio/visual data transmitting device and the second group ID storage unit of the audio/visual data reproducing device. Therefore, when the group ID included in data transmitted from the audio/visual data transmitting device is identical with the group ID stored in the second group ID storage unit, the audio/visual data reproducing device receives data.

Therefore, even when a plurality of audio/visual data transmitting devices are connected to the power line, the group ID enables the audio/visual data reproducing device to reproduce audio/visual data having the same group ID.

Furthermore, in the invention, since the group IDs stored in the second group ID storage unit are allocated to rooms according to the purpose of usage of the rooms, it is possible to prevent audio/visual data from being transmitted (reproduced) to the rooms not related to broadcasting or the rooms that are not used in the hotel or school, and thus to improve the efficiency of reproduction. In particular, in the hotel, a room to be used by a user is set according to the language of the user, which makes it possible to perform broadcasting in a language corresponding to the user in the case of emergency broadcasting, and thus to improve safety in using facilities.

DESCRIPTION OF THE REFERENCE SYMBOLS

1 POWER LINE
2 (2a, 2b) AUDIO DATA TRANSMITTING DEVICE
20 DATA STORAGE UNIT
24 DATA GENERATING UNIT
25 DATA TRANSMITTING UNIT
26 MESSAGE RECEIVING UNIT
27 DATA SETTING UNIT
3 (3a to 3f) AUDIO DATA REPRODUCING SPEAKER
31 MESSAGE TRANSMITTING UNIT
32 MESSAGE GENERATING UNIT
33 INSTRUCTION INPUT UNIT
34 DATA STORAGE UNIT
35 DATA RECEIVING UNIT
36 AUDIO DATA REPRODUCING UNIT
4 (4a, 4b, 4c, 4d, 4f, 4g, 4h)OUTLET
5 PACKET

BEST MODE FOR CARRYING OUT THE INVENTION

Hereinafter, a first embodiment of the invention will be described with reference to the accompanying drawings.

Figure 2:
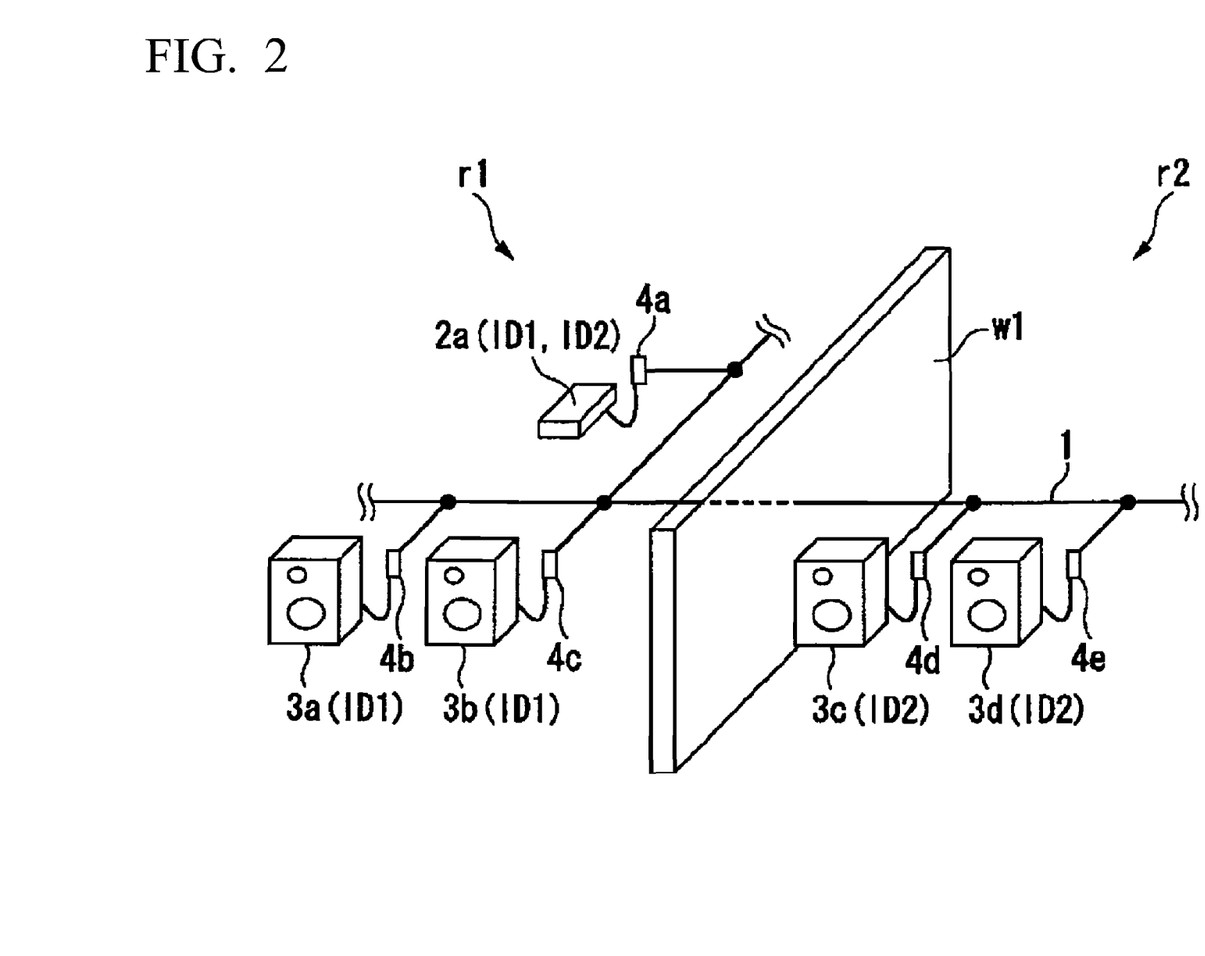
FIG. 2 is a diagram illustrating an audio data communication system according to the first embodiment of the invention.

FIG. 2 is a diagram illustrating an audio data communication system according to the first embodiment of the invention.

The audio data communication system according to the first embodiment includes an audio data transmitting device 2a and an audio data reproducing speakers 3. In this embodiment, audio data reproducing speakers 3a, 3b, 3c, and 3d are arranged as the audio data reproducing speakers 3.

A room r1 having the audio data transmitting device 2a and the audio data reproducing speakers 3a and 3b provided therein and a room r2 having the audio data reproducing speakers 3c and 3d provided therein are partitioned by a wall w1.

A power line 1 used to supply power to, for example, electric home appliances is provided in the room r1 and the room r2. Outlets 4a to 4c for obtaining power from the power line 1 are provided in the room r1. Similarly, outlets 4d and 4c are provided in the room r2.

The audio data transmitting device 2a is connected to the outlet 4a. The audio data reproducing speakers 3a and 3b are connected to the outlets 4b and 4c, respectively.

The audio data reproducing speakers 3c and 3d are connected to the outlets 4d and 4e, respectively. In this way, power is supplied from the power line 1 to the audio data transmitting device 2a and the audio data reproducing speakers 3a to 3d to drive these apparatuses.

In this embodiment, the power line 1 is used for data communication as well as the supply of power. Therefore, it is possible to perform power line communication between the audio data transmitting device 2a and the audio data reproducing speakers 3a to 3d through the power line 1.

In the audio data communication system according to this embodiment, different group IDs 'ID1' and 'ID2' are allocated to the audio data reproducing speakers 3a and 3b provided in the room r1 and the audio data reproducing speakers 3c and 3d provided in the room r2.

Audio data corresponding to the group ID is transmitted from the audio data transmitting device 2a, and different audio data are reproduced by the audio data reproducing speakers 3a and 3b and the audio data reproducing speakers 3c and 3d having different group IDs.

Figure 3:
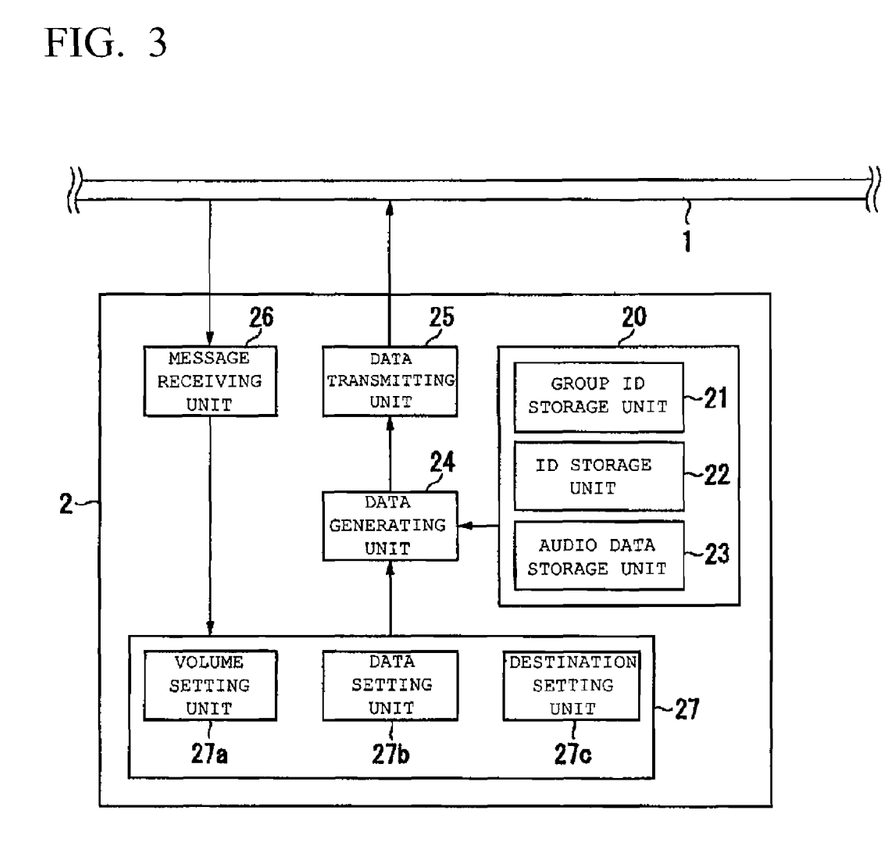
FIG. 3 is a block diagram illustrating an audio data transmitting device 2 according to the first embodiment.

Next, the structure of the audio data transmitting device 2 will be described in detail below.

FIG. 3 is a block diagram illustrating the structure of the audio data transmitting device 2 according to the first embodiment of the invention.

The audio data transmitting device 2 according to this embodiment includes a data storage unit 20, a data generating unit 24, a data transmitting unit 25, a message receiving unit 26, and a data setting unit 27.

The message receiving unit 26 receives a message transmitted from the audio data reproducing speakers 3 through the power line 1 and outputs the received message to the data setting unit 27.

The data setting unit 27 includes a volume setting unit 27a, a data setting unit 27b, and a destination setting unit 27c. When the message is input to the data setting unit 27 from the message receiving unit 26, the data setting unit 27 distributes the message to the volume setting unit 27a, the data setting unit 27b, and the destination setting unit 27c on the basis of the content of the message.

For example, when the message received by the data setting unit 27 includes an instruction to turn up the volume, the message is distributed to the volume setting unit 27a, and the volume is adjusted according to the instruction included in the message.

When the message received by the data setting unit 27 includes an instruction to transmit predetermined audio data, the message is distributed to the data setting unit 27b, and the type of data to be transmitted to the audio data reproducing speakers 3 is set according to the instruction included in the message.

This is effective in applying the audio data communication system according to this embodiment to a 5.1 channel Dolby surround system. That is, when a plurality of audio data reproducing speakers 3a and 3b (FIG. 2) are provided with respect to one audio data transmitting device 2a (FIG. 2), this is effective in allocating a plurality of audio data to the plurality of audio data reproducing speakers 3a and 3b and reproducing the audio data.

The data storage unit 20 includes a group ID storage unit 21, an ID storage unit 22, and an audio data storage unit 23.

Audio data to be transmitted from the audio data transmitting device 2 to the audio data reproducing speakers 3 is stored in the audio data storage unit 23. The audio data stored in the audio data storage unit 23 is, for example, classical music data.

The ID storage unit 22 stores unique ID of the audio data transmitting device 2. Even when a plurality of audio data transmitting devices 2 are connected to the power line 1, the unique IDs make it possible to identify the audio data transmitting devices.

Group IDs are stored in the group ID storage unit 21. The group ID is ID for identifying the audio data. For example, the group ID is shared between the audio data transmitting device and the audio data reproducing speakers of a 5.1 channel Dolby surround system. When an audio data communication system is connected to the power line 1 by using a plurality of Dolby surround systems, the group ID is used to identify the Dolby surround system.

For example, in FIG. 2, a group ID 'ID1' is allocated to the audio data transmitting device 2a and the audio data reproducing speakers 3a and 3b, and a group ID 'ID2' is allocated to the audio data transmitting device 2a and the audio data reproducing speakers 3c and 3d.

In FIG. 3, the data generating unit 24 generates packets to be output from the audio data transmitting device 2 to the audio data reproducing speakers 3, on the basis of data input from the group ID storage unit 21, the ID storage unit 22, the audio data storage unit 23, and the data setting unit 27.

Figure 4:
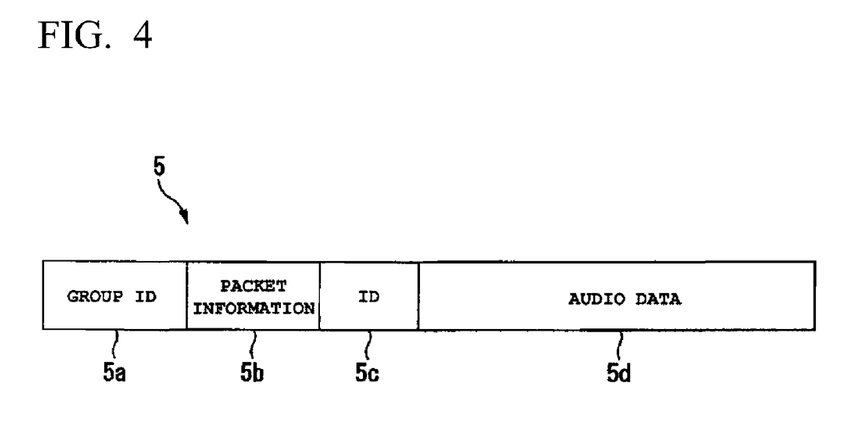
FIG. 4 is a diagram illustrating an example of a packet 5 transmitted from the audio data transmitting device 2.

FIG. 4 shows an example of the structure of a packet 5 generated by the data generating unit 24. The packet 5 includes a group ID 5a, packet information 5b, an ID number 5c, and audio data 5d.

The group ID 5a is generated on the basis of data of 'group ID' input from the group ID storage unit 21 (FIG. 3). Since the packet 5 includes data of 'group ID', the data of the packet 5 can be transmitted to only the audio data reproducing speakers of a specific Dolby surround system.

The packet information 5b is data indicating which information is included in the packet 5. For example, the packet information 5b includes data indicating which of six audio data used for the Dolby surround system is included in the packet 5.

The ID number 5c is generated on the basis of data on ID input from the ID storage unit 22 (FIG. 3). Since the packet 5 includes data on ID, it is possible to identify which audio data transmitting device the packet 5 is transmitted from even when a plurality of audio data transmitting devices 2 are connected to the power line 1.

The packet 5 (FIG. 4) generated by the data generating unit 24 is output to the data transmitting unit 25. Then, the packet 5 is transmitted from the data transmitting unit 25 to the audio data reproducing speakers 3 through the power line 1.

Next, the structure of the audio data reproducing speaker 3 (FIG. 2) will be described in detail below.

Figure 1:
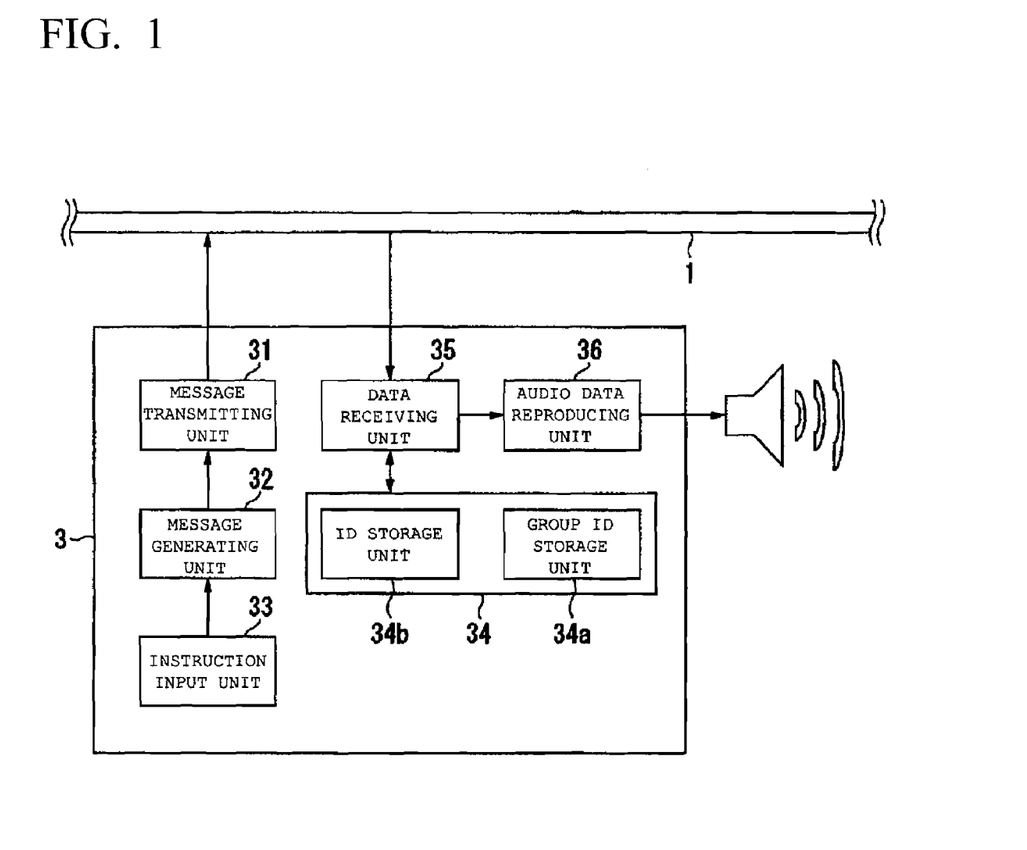
FIG. 1 is a block diagram of illustrating an audio data reproducing speaker 3 according to a first embodiment of the invention.

FIG. 1 is a block diagram illustrating the structure of the audio data reproducing speaker 3 according to this embodiment.

The audio data reproducing speaker 3 includes a message transmitting unit 31, a message generating unit 32, an instruction input unit 33, a data storage unit 34, a data receiving unit 35, and an audio data reproducing unit 36.

The data storage unit 34 includes a group ID storage unit 34a and an ID storage unit 34b.

The group ID storage unit 34a stores group IDs. When a plurality of audio data transmitting devices 2 are connected to the power line 1, the group ID is used to determine one of the audio data transmitting devices 2 that transmits the audio data to be reproduced by the audio data reproducing speaker 3.

Unique IDs of the audio data reproducing speakers 3 are stored in the ID storage unit 34b. Since group IDs are stored in the group ID storage unit 34a, the audio data reproducing speaker 3 can determine which of the audio data transmitting devices transmits data of the packet 5 (see FIG. 4).

However, it is difficult for the audio data reproducing speaker 3 to determine to receive which of six audio data output from the Dolby surround system, on the basis of only the group ID. Therefore, ID of the audio data reproducing speaker 3 is used to determine which audio data is allocated to the audio data reproducing speakers 3 having the same group ID.

The data receiving unit 35 is connected to the power line 1, and receives the packet 5 (see FIG. 4) transmitted from a predetermined audio data transmitting device 2. The data receiving unit 35 determines whether to receive the packet 5 on the basis of 'ID' or 'the group ID' stored in the data storage unit 34.

When receiving the packet 5 allocated to the audio data reproducing speaker 3, the data receiving unit 35 outputs the packet 5 to the audio data reproducing unit 36. In the output data reproducing unit 36, for example, classical music is output from the speaker.

The instruction input unit 33 receives instructions from a user of the audio data reproducing speaker 3. For example, an instruction to adjust the volume of the speaker of the audio data reproducing unit 36, an instruction to change the genre of music reproduced by the audio data reproducing unit 36, or an instruction to change the audio data transmitting device 2, which is a source of data, is input to the instruction input unit 33.

The instructions of a user may be input to the instruction input unit 33 through a remote controller, or the user may directly input instructions through buttons provided in the audio data reproducing speakers 3.

The instructions of the user input through the instruction input unit 33 is output to the message generating unit 32. The message generating unit 32 generates a message requesting the change of data to be transmitted to the audio data transmitting device 2, on the basis of the instructions of the user input through the instruction input unit 33.

The message generated by the message generating unit 32 is output to the message transmitting unit 31. The message transmitting unit 31 transmits the message input from the message generating unit 32 to the audio data transmitting device 2 through the power line 1.

Figure 5:
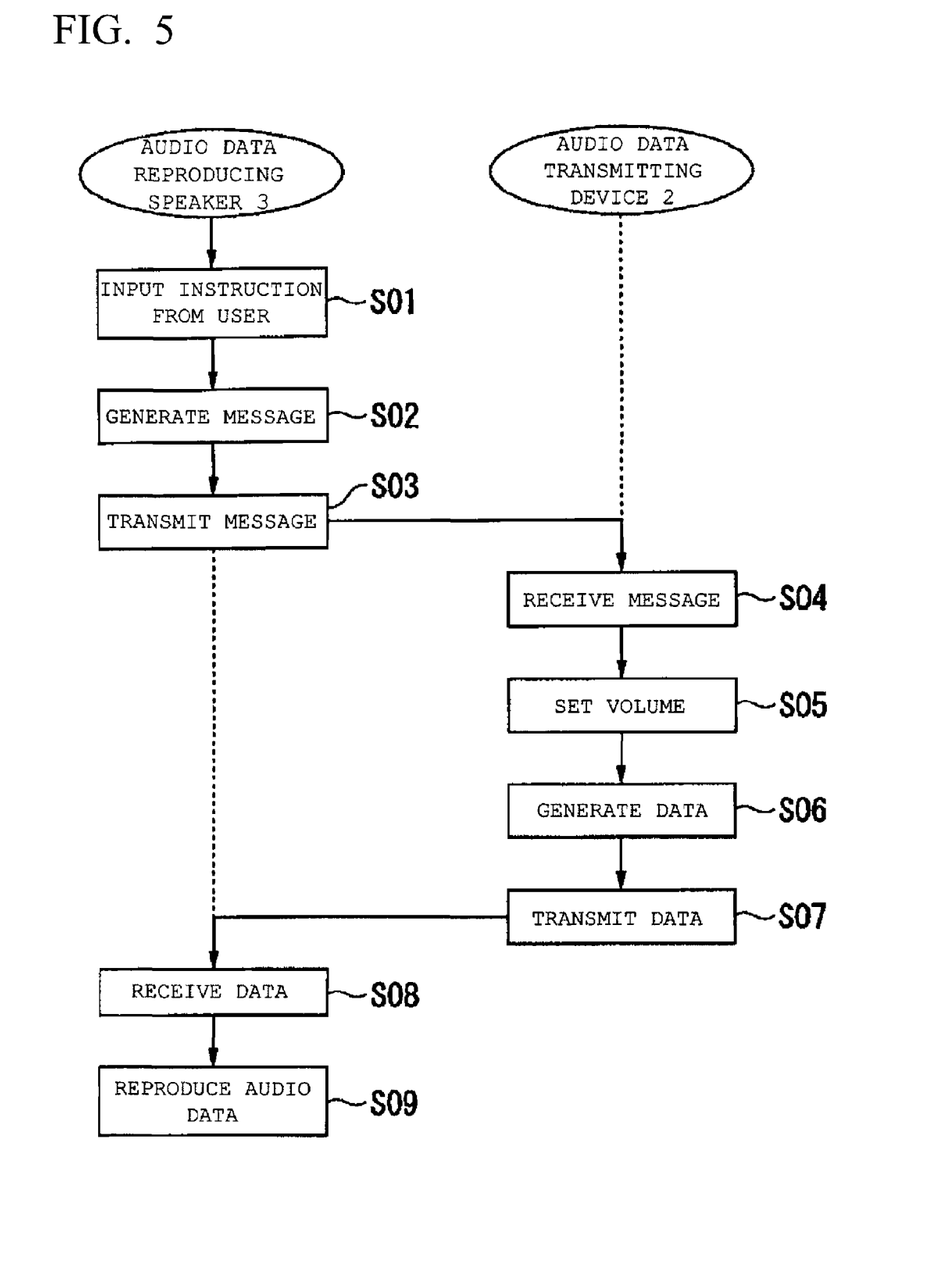
FIG. 5 is a flow chart illustrating a volume changing process by the audio data reproducing device.

Next, a process of changing the volume of audio data output from the audio data reproducing speaker 3 by using the audio data communication system according to the first embodiment of the invention will be described with reference to the sequence shown in FIG. 5.

When the user listens to music output from the audio data reproducing speaker 3, the user inputs an instruction to turn up the volume to the instruction input unit 33 of the audio data reproducing speaker 3 by using, for example, a remote controller.

The instruction of the user to turn up the volume is input to the instruction input unit 33 through, for example, a remote controller (step S01).

Next, the message generating unit 32 generates a message including the instruction to turn up the volume on the basis of the instruction of the user input through the instruction input unit 33 (step S02).

Then, the message generated by the message generating unit 32 is input to the message transmitting unit 31, and is then transmitted to the audio data transmitting device 2 through the power line 1 (step S03).

Data of the message transmitted by the audio data reproducing speaker 3 is received by the message receiving unit 26 of the audio data transmitting device 2 (step S04). Then, the data received by the message receiving unit 26 is output to the data setting unit 27.

The data setting unit 27 turns up the volume of the audio data to be transmitted to the audio data reproducing speaker 3, on the basis of the instruction to turn up the volume included in the received message (step S05).

The data generating unit 24 combines the volume set by the volume setting unit 27a with the data input from the audio data storage unit 23 to generate data of the packet 5 (FIG. 4) to be transmitted to the audio data reproducing speaker 3 (step S06).

The data transmitting unit 25 transmits the data of the packet 5 generated by the data generating unit 24 to the audio data reproducing speaker 3 through the power line 1 (step S07).

The data receiving unit 35 of the audio data reproducing speaker 3 receives the data of the packet 5 transmitted from the audio data transmitting device 2 through the power line 1 (step S08).

The audio data reproducing unit 36 reproduces the data of the packet 5 input from the data receiving unit 35, so that the audio data whose volume is turned up is output from the speaker (step S09).

According to this embodiment, even when an audio data transmitting device 2b and audio data reproducing speakers 3e and 3f are additionally connected to the audio data communication system shown in FIG. 2 through the power line 1, it is possible for users to listen to music in the rooms r1 to r3 by using the Dolby surround system.

Figure 6:
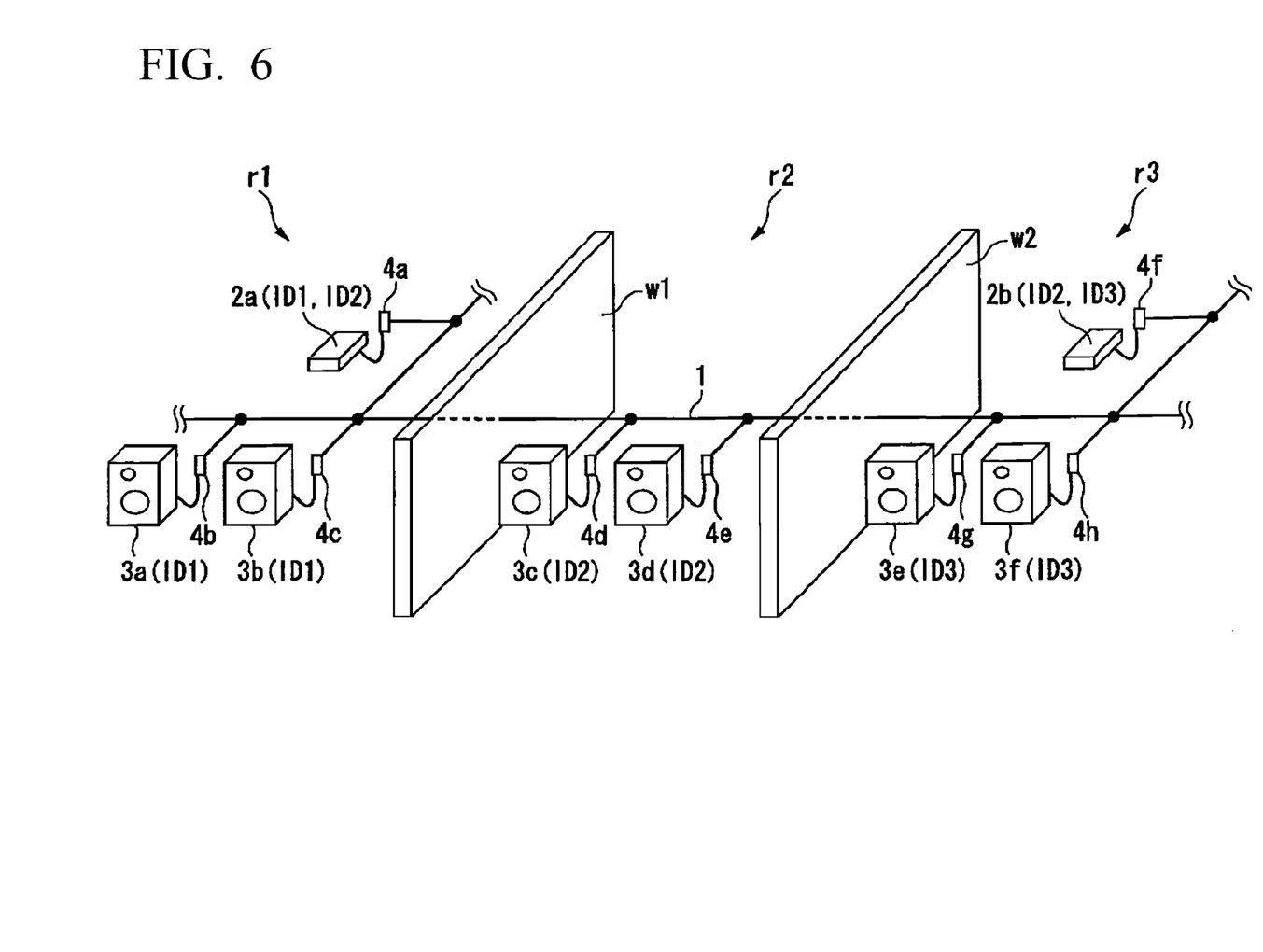
FIG. 6 is a diagram illustrating the audio data communication system according to the first embodiment of the invention.

In FIG. 6, the audio data reproducing speakers 3a and 3b have the group ID 'ID1', and it is possible to reproduce music specified by the group ID 'ID1' in the room r1 by reproducing the audio data transmitted from the audio data transmitting device 2a.

Further, the audio data reproducing speakers 3e and 3f have a group ID 'ID3', and it is possible to reproduce music specified by the group ID 'ID3' in the room r3 by reproducing the audio data transmitted from the audio data transmitting device 2b.

The audio reproducing speakers 3c and 3d arranged in the room r2 have the group ID 'ID2'. Since the audio data specified by the group ID 'ID2' is stored in both the audio data transmitting devices 2a and 2b, the audio reproducing speakers 3c and 3d may receive audio data from one of the audio data transmitting devices 2a and 2b and reproduce the audio data. The ID number 5c of the audio data transmitting device included in the packet 5 determines which of the audio data of the audio data transmitting devices 2a and 2b the audio reproducing speakers 3c and 3d receive.

In FIG. 6, even when the audio data reproducing speaker 3d is out of order and another audio data reproducing speaker is connected to the outlet 4e, it is possible to reproduce music using the additional audio reproducing speaker by only resetting the group ID, without setting other conditions.

In this way, for example, when an instruction to turn up the volume is output from a certain audio data reproducing speaker 3, it is possible to control another audio data reproducing speaker 3 having the same group ID to turn up the volume by managing one audio data communication system for every group ID.

According to the audio data communication system in accordance with the first embodiment of the invention, communication channels are divided for the audio data transmitting device 2 and the audio data reproducing speakers 3, which makes it possible to improve the efficiency of communication.

Further, the audio data reproducing speaker 3 preferably receives only the data transmitted from a specific audio data transmitting device 2, which makes it possible to simplify the receiving function of the audio data reproducing speaker 3.

The audio data transmitting device collectively controls the audio data reproducing speakers 3 having the same group ID, which makes it possible to reduce a communication load of the audio data transmitting device 2.

In the above-described embodiment, the audio data is transmitted through the power line 1, but the invention is not limited thereto. For example, visual data may be transmitted through the power line 1.

Figure 7:
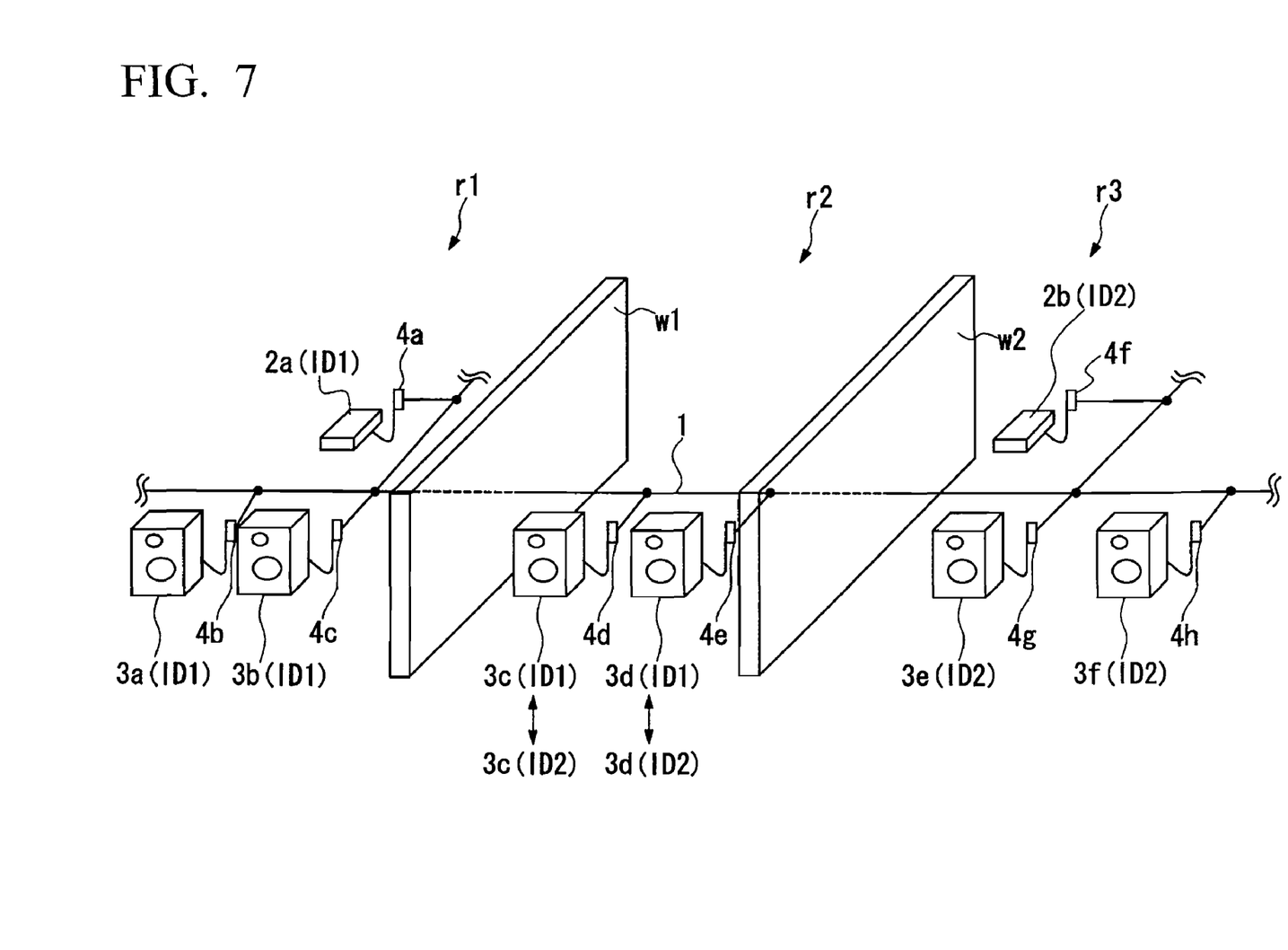
FIG. 7 is a diagram illustrating an audio data communication system according to a second embodiment of the invention.

Next, a second embodiment of the invention will be described below with reference to FIG. 7. In the second embodiment, the same components as those in the first embodiment have the same reference numerals, and a description thereof will be omitted.

In the first embodiment, different group IDs are allocated to the audio data reproducing speakers 3a to 3f arranged in the room r1, r2, and r3. However, in the second embodiment, as shown in FIG. 7, group IDs of group ID storage units 34a of the audio data reproducing speakers 3 are changed according to the purpose of usage of the rooms r1, r2, and r3.

In the related art, in the facilities having a plurality of rooms, such as a hotel and a school, the same information (broadcasting content) is notified to all the rooms. Therefore, users not related to the notified information also listen to the broadcasted information carefully, which causes the users to temporarily stop their work. In addition, the information is also notified to the rooms not related to the broadcasted information or the rooms that are not used, which is inefficient. Further, in the case of emergency, since one specific language is used for emergency broadcasting, foreigners using different languages may not understand the broadcasted information, which makes it difficult for the foreigners to rapidly deal with the emergency.

In the second embodiment, different group IDs are allocated to the audio data reproducing speakers 3a to 3f arranged in the rooms r1, r2, and r3 according to the purpose of usage of the rooms r1, r2, and r3, and the audio data transmitting devices 2a and 2b transmits necessary information corresponding to the group IDs suitable for the purpose of usage.

For example, assuming that the rooms r1, r2, and r3 are rooms of a hotel, the rooms r1 and r2 are prepared for domestic guests, and the room 3 is prepared for foreign guests, the group ID 'ID1' is allocated to the audio data reproducing speakers 3a to 3d arranged in the rooms r1 and r2, and the group ID 'ID 2' is allocated to the audio data reproducing speakers 3e and 3f arranged in the room r3. In this case, when emergency broadcasting data is transmitted, Japanese emergency broadcasting information (audio data) including the group ID 'ID1' is transmitted from the audio data transmitting device 2a to the rooms r1 and r2 for domestic guests (user) through the power line 1, and the Japanese emergency broadcasting data is reproduced by only the audio data reproducing speakers 3a to 3d arranged in the rooms r1 and r2 to which the group ID 'ID1' is allocated.

Meanwhile, foreign language (for example, English) emergency broadcasting information (audio data), which includes the group ID 'ID2', corresponding to the foreign guest (user) is transmitted from the audio data transmitting device 2b to the room r3 through the power line 1, and the foreign language emergency broadcasting data is reproduced by only the audio data reproducing speakers 3e and 3f arranged in the room 3 to which the group ID 'ID2' is allocated.

An example in which this embodiment is applied to a school will be described below. In the example, it is assumed that the rooms r1 and r2 are used as classrooms for the fourth to sixth grades in the elementary school, for example, and the room r3 is used as a classroom for one of the first to third grades. In this case, when local broadcasting is performed in the school, broadcasting data (audio data) for the fourth to sixth grades, including the group ID 'ID1', is transmitted from the audio data transmitting device 2 to the rooms r1 and r2, which are classrooms for the fourth to sixth grades, through the power line 1, and the broadcasting data for the fourth to sixth grades is reproduced by only the audio data reproducing speakers 3a to 3d arranged in the rooms r1 and r2 to which the group ID 'ID1' is allocated.

Meanwhile, broadcasting data (audio data) for the first to third grades, including the group ID 'ID2', is transmitted from the audio data transmitting device 2b to the room r3 through the power line 1, and the broadcasting data for the first to third grades is reproduced by only the audio data reproducing speakers 3e and 3f arranged in the room r3 to which the group ID 'ID2' is allocated.

In the audio data reproducing speakers 3a to 3f, a user or an administrator may arbitrarily change the group IDs of the group ID storage unit 34a according to users for the rooms r1, r2, and r3. Alternatively, in order to perform the change, control signals may be transmitted from the audio data transmitting devices 2a and 2b to the audio data reproducing speakers 3a to 3f through the power line 1.

In the second embodiment, the group IDs 'ID1' and 'ID2' of the group ID storage unit 34a of each of the audio data reproducing speakers 3a to 3f are allocated to the rooms r1, r2, and r3 according to the purpose of usage of the rooms r1, r2, and r3. Therefore, it is possible to prevent audio data from being transmitted (reproduced) to rooms not related to broadcasting or rooms that are not used in the hotel or school, which makes it possible to effectively reproduce broadcasting data. In particular, in the hotel, a room to be used by a user is set according to the language of the user, which makes it possible to perform broadcasting in a language corresponding to the user in the case of emergency broadcasting, and thus to improve safety in using facilities.

The exemplary embodiments of the invention have been described above with reference to the drawings, but the invention is not limited thereto. Various modifications and changes of the invention can be made without departing from the scope and spirit of the invention.

INDUSTRIAL APPLICABILITY

According to the audio data communication system using the power line according to the present invention can be applied to a 5.1 channel Dolby surround system.

The invention claimed is:

1. An audio/visual data communication system comprising:
    an audio/visual data transmitting device that transmits data through a power line; and
    an audio/visual data reproducing device that receives the data and reproduces the data,
    wherein the audio/visual data reproducing device includes:
    an instruction input unit that inputs an instruction to change the data received from the audio/visual data transmitting device;
    a message generating unit that generates a message for requesting to change the data transmitted from the audio/visual data transmitted device on the basis of the instruction input through the instruction input unit; and
    a message transmitting unit that transmits the message generated by the message generating unit to the audio/visual data transmitting device, and
    the audio/visual data transmitting device includes:
    a message receiving unit that receives the message transmitted from the message transmitting unit;
    a data setting unit that sets data to be transmitted to the audio/visual data reproducing device on the basis of the message received by the message receiving unit;
    a data generating unit that generates transmission data to be transmitted to the audio/visual data reproducing device on the basis of the data set by the data setting unit; and
    a data transmitting unit that transmits the transmission data generated by the data generating unit to the audio/visual data reproducing device.

2. The audio/visual data communication system according to claim 1, wherein the audio/visual data transmitting device further includes a first group ID storage unit that stores group IDs for identifying the same audio/visual data, the audio/visual data reproducing device further includes a second group ID storage unit that stores the group IDs, the data generating unit generates the transmission data having the group ID stored in the first group ID storage unit, and the audio/visual data reproducing device receives data when the group ID included in the transmission data transmitted from the data transmitting unit is identical with the group ID stored in the second group ID storage unit.

3. The audio/visual data communication system according to claim 2, wherein the audio/visual data reproducing devices are arranged in a plurality of rooms, and the group IDs stored in the second group ID storage unit are allocated to the rooms according to the purpose of usage of the rooms.

4. An audio/visual data transmitting device that transmits data to an audio/visual data reproducing device through a power line, comprising:

a data storage unit that stores unique IDs allocated to the audio/video reproducing devices, group IDs for identifying the same audio/visual data, and audio/visual data;

a message receiving unit that receives a message for requesting to change data to be transmitted to the audio/visual data reproducing device;

a data setting unit that sets the data to be transmitted to the audio/visual data reproducing device on the basis of the message received by the message receiving unit;

a data generating unit that generates transmission data on the basis of the data stored in the data storage unit and the data set by the data setting unit; and a data transmitting unit that transmits the transmission data generated by the data generating unit to the audio/visual data reproducing device through the power line.

5. The audio/visual data transmitting device according to claim 4, wherein the data setting unit sets the volume of the audio/visual data, the type of the audio/visual data, or a change of the audio/visual data transmitting device, which is a source of the audio/visual data.

6. An audio/visual data reproducing device that receives data from an audio/visual data transmitting device through a power line, comprising:

a data storage unit that stores unique IDs allocated to the audio/visual data reproducing devices and group IDs for identifying the same audio/visual data;

a data receiving unit that determines whether to receive data transmitted from the audio/visual data transmitting device through the power line on the basis of the data stored in the data storage unit;

an audio/visual data reproducing unit that reproduces the data received by the data receiving unit;

an instruction input unit that inputs an instruction to change data reproduced by the audio/visual data reproducing device;

a message generating unit that generates a message for requesting to change data to be transmitted to the audio/visual data transmitting device on the basis of the instruction input through the instruction input unit; and a message transmitting unit that transmits the message generated by the message generating unit to the audio/visual data transmitting device through the power line.

* * * * *